(12) United States Patent
Finke et al.

(10) Patent No.: US 12,084,195 B2
(45) Date of Patent: Sep. 10, 2024

(54) DUAL DRIVE, DUAL CLUTCH DRIVE SYSTEM FOR AN AIRCRAFT ACCESSORY

(71) Applicant: Hamilton Sundstrand Corporation, Charlotte, NC (US)

(72) Inventors: Aaron M. Finke, Janesville, WI (US); Michael R. Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 447 days.

(21) Appl. No.: 17/377,551

(22) Filed: Jul. 16, 2021

(65) Prior Publication Data
US 2022/0348347 A1 Nov. 3, 2022

Related U.S. Application Data

(60) Provisional application No. 63/181,425, filed on Apr. 29, 2021.

(51) Int. Cl.
*B64D 41/00* (2006.01)
*B64D 27/10* (2006.01)
(Continued)

(52) U.S. Cl.
CPC ............ *B64D 41/00* (2013.01); *B64D 27/10* (2013.01); *F16D 13/52* (2013.01); *F16D 13/72* (2013.01); *F16D 13/74* (2013.01); *F16D 41/00* (2013.01)

(58) Field of Classification Search
CPC . B64D 41/00; B64D 27/10; F02C 7/36; F02C 7/32; F02C 3/107; F16D 13/52;
(Continued)

(56) References Cited

U.S. PATENT DOCUMENTS 3,290,963 A * 12/1966 Oldfield ................ F02C 7/36 60/788
4,776,163 A 10/1988 Brockmann
(Continued)

FOREIGN PATENT DOCUMENTS

WO 2009067048 A1 5/2009

OTHER PUBLICATIONS

European Search Report for European Application No. 22165680.4; Report Mail Date Sep. 21, 2022 (pp. 1-6).
(Continued)

*Primary Examiner* — Lori Wu
(74) *Attorney, Agent, or Firm* — CANTOR COLBURN LLP

(57) ABSTRACT

A dual drive, dual clutch accessory drive system for an aircraft including a first input shaft connected to a first pressure spool of a turbine engine. The first input shaft rotates at a first speed. A second input shaft is connected to a second spool of the turbine engine that is distinct from the first spool. The second input shaft rotates at a second speed. An output shaft operatively connected to an aircraft accessory. A first drive path selectively operatively connects the first input shaft with the output shaft. The first drive path includes a first clutch. The first drive path being operable to rotate the output shaft at the first speed. A second drive path operatively connects the second input shaft with the output shaft. The second drive path includes a second clutch. The second drive path is operable to rotate the output shaft at the second speed.

14 Claims, 4 Drawing Sheets

(51) Int. Cl.
  *F16D 13/52* (2006.01)
  *F16D 13/72* (2006.01)
  *F16D 13/74* (2006.01)
  *F16D 41/00* (2006.01)
(58) Field of Classification Search
  CPC .......... F16D 13/72; F16D 13/74; F16D 41/00; F05D 2260/40; F05D 2220/76
  See application file for complete search history.

(56) References Cited

U.S. PATENT DOCUMENTS

| | | |
|---|---|---|
| 7,942,079 B2 | 5/2011 | Russ |
| 8,876,650 B2 | 11/2014 | Lemmers, Jr. |
| 9,428,267 B2 | 8/2016 | Devita et al. |
| 10,570,816 B2 | 2/2020 | Thomassin et al. |
| 10,590,867 B2 | 3/2020 | Thomassin et al. |
| 10,738,709 B2 | 8/2020 | Forest et al. |
| 10,767,568 B2 | 9/2020 | Leque et al. |
| 10,890,115 B2 | 1/2021 | Polly et al. |
| 10,900,374 B1 | 1/2021 | Finke et al. |
| 10,914,377 B2 | 2/2021 | Finke et al. |
| 2006/0272313 A1 | 12/2006 | Eick et al. |
| 2007/0130959 A1 | 6/2007 | Linet et al. |
| 2007/0137219 A1 | 6/2007 | Linet et al. |
| 2008/0110151 A1 | 5/2008 | Welch et al. |
| 2008/0200299 A1 | 8/2008 | Russ |
| 2012/0015776 A1 | 1/2012 | Lemmers, Jr. |
| 2013/0199156 A1 | 8/2013 | Ress, Jr. et al. |
| 2015/0311770 A1 | 10/2015 | Goi et al. |
| 2018/0209513 A1 | 7/2018 | Lemmers, Jr. |
| 2020/0284201 A1 | 9/2020 | Gebhard et al. |
| 2020/0332862 A1 | 10/2020 | Bortoli et al. |
| 2021/0388733 A1 | 12/2021 | Valois et al. |
| 2022/0025778 A1 | 1/2022 | Harms et al. |

OTHER PUBLICATIONS

European Search Report for European Application No. 22171002.3; Report Mail Date Sep. 20, 2022 (pp. 1-8).
European Search Report for European Application No. 22162632.8; Report Mail Date Aug. 30, 2022 (pp. 1-7).

* cited by examiner

DUAL DRIVE, DUAL CLUTCH DRIVE SYSTEM FOR AN AIRCRAFT ACCESSORY

CROSS-REFERENCE TO RELATED APPLICATIONS

This application claims the benefit of U.S. Provisional Patent Application No. 63/181,425, filed Apr. 29, 2021, the disclosure of which is incorporated herein by reference in its entirety.

BACKGROUND

Exemplary embodiments pertain to the art of aircraft and, more particularly, to dual drive, dual clutch accessory drive system for an aircraft.

Many aircraft include a generator and other accessories that are driven from a turbine engine. The generator may operate as an auxiliary power unit (APU) that provides electrical power to other aircraft accessories. Typically, the generator is directly run off of a high pressure spool of a turbine engine that powers the aircraft. The high pressure spool has a speed range that is more or less compatible with the generator. The direct connection drives the generator as long as the turbine engine is in operation.

BRIEF DESCRIPTION

Disclosed is a dual drive, dual clutch accessory drive system for an aircraft including a first input shaft connected to a first pressure spool of a turbine engine. The first input shaft rotates at a first speed. A second input shaft is connected to a second spool of the turbine engine that is distinct from the first spool. The second input shaft rotates at a second speed. An output shaft operatively connected to an aircraft accessory. A first drive path selectively operatively connects the first input shaft with the output shaft. The first drive path includes a first clutch. The first drive path being operable to rotate the output shaft at the first speed. A second drive path operatively connects the second input shaft with the output shaft. The second drive path includes a second clutch. The second drive path is operable to rotate the output shaft at the second speed.

Additionally, or alternatively, in this or other non-limiting examples, the first drive path includes a gear mechanically connecting the first input shaft with the output shaft.

Additionally, or alternatively, in this or other non-limiting examples, the second drive path includes another gear mechanically connecting the second input shaft to the output shaft.

Additionally, or alternatively, in this or other non-limiting examples, the first clutch is a selectively activatable clutch.

Additionally, or alternatively, in this or other non-limiting examples, the selectively activatable clutch is a wet clutch.

Additionally, or alternatively, in this or other non-limiting examples, a clutch actuator operable to selectively engage the selectively activatable clutch.

Additionally, or alternatively, in this or other non-limiting examples, the second clutch is a passive clutch.

Additionally, or alternatively, in this or other non-limiting examples, the passive clutch is a one-way clutch.

Additionally, or alternatively, in this or other non-limiting examples, the first drive path is mechanically isolated from the second drive path via the second clutch.

Additionally, or alternatively, in this or other non-limiting examples, the first input shaft is connected to a low pressure spool of a turbine engine of the aircraft and the second input shaft is connected to a high pressure spool of the turbine engine.

Also discloses is a method of driving an accessory for an aircraft through a dual shaft, dual clutch accessory drive system includes determining that a first speed of a first input shaft of the dual shaft, dual clutch accessory drive system is rotating in a first speed zone, engaging an activatable clutch in a first drive path to connect the first input shaft to an output shaft, determining that the first input shaft is rotating at a second speed that is outside the first speed zone, and disengaging the activatable clutch to mechanically connect a second input shaft to the output shaft through a second drive path.

Additionally, or alternatively, in this or other non-limiting examples, disengaging the activatable clutch mechanically isolates the first input shaft from the output shaft.

Additionally, or alternatively, in this or other non-limiting examples, disengaging the activatable clutch includes mechanically connecting the second input shaft to the output shaft through a second clutch.

Additionally, or alternatively, in this or other non-limiting examples, mechanically connecting the second input shaft to the output shaft includes passing torque through a passive clutch.

Additionally, or alternatively, in this or other non-limiting examples, passing torque through the passive clutch includes passing torque through a one-way clutch.

Additionally, or alternatively, in this or other non-limiting examples, engaging the activatable clutch includes activating the clutch with a clutch actuator.

Additionally, or alternatively, in this or other non-limiting examples, activating the activatable clutch includes passing a control pressure from a clutch controller to the activatable clutch.

Additionally, or alternatively, in this or other non-limiting examples, engaging the activatable clutch connects the output shaft to a low pressure spool of a turbine engine of the aircraft.

Additionally, or alternatively, in this or other non-limiting examples, disengaging the clutch connects the output shaft to a high pressure spool of the turbine engine of the aircraft.

Additionally, or alternatively, in this or other non-limiting examples, engaging the activatable clutch includes activating a wet clutch.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
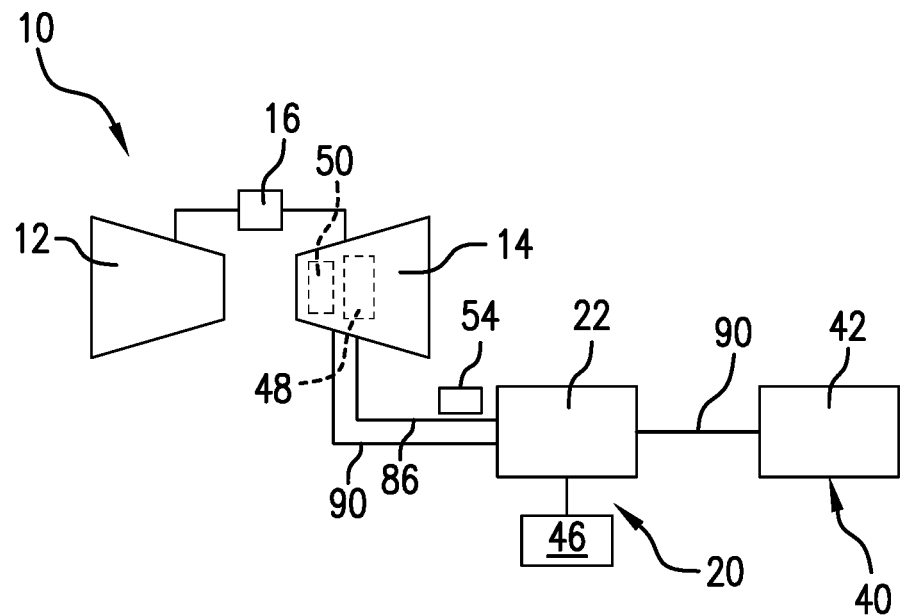
FIG. 1 is a schematic view of a turbine engine for an aircraft including a dual drive, dual clutch accessory drive system, in accordance with a non-limiting example.

A turbine engine, in accordance with a non-limiting example, is indicated at 10 in FIG. 1. Turbine engine 10 includes a compressor portion 12 and a turbine portion 14 linked through a combustor 16. A dual drive, dual clutch drive system 20 is connected to turbine portion 14. In a non-limiting example, dual drive, dual clutch drive system 20 takes the form of an accessory gear box 22 connected to an aircraft accessory 40. Aircraft accessory 40 may take the form of a generator 42. However, it should be appreciated that aircraft accessory 40 can take on various forms including engine accessory systems such as oil pumps, or airframe accessory systems such as air generation systems.

Figure 2:
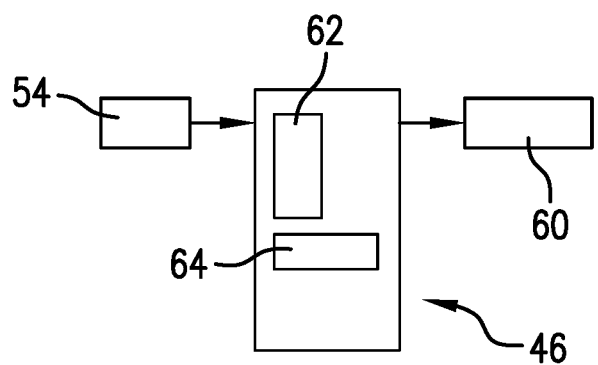
FIG. 2 depicts a block diagram illustrating a clutch controller of the dual drive, dual clutch accessory drive system of FIG. 1, in accordance with a non-limiting example.

Dual drive, dual clutch drive system 20 is coupled to a clutch actuator 46. Clutch actuator 46 delivers an actuation fluid to activate an activatable clutch 60 in dual drive, dual clutch drive system 20. As shown in FIG. 2, clutch actuator 46 includes a central processor 62 and a non-volatile memory 64 that contains a set of instructions for activating activatable clutch 60 based on speed inputs from speed sensor 54. For example, clutch actuator 46 may operate in a first configuration and activate activatable clutch 60 when low pressure spool 48 is operating in a selected speed zone, and in a second configuration when low pressure spool 48 is operating outside of the selected or defined speed zone. In the second configuration, clutch actuator 46 may disengage activatable clutch 60 to decouple low pressure spool 48 from accessory 40 and pass torque to accessory 40 from high pressure spool 50 as will be detailed herein.

Figure 3:
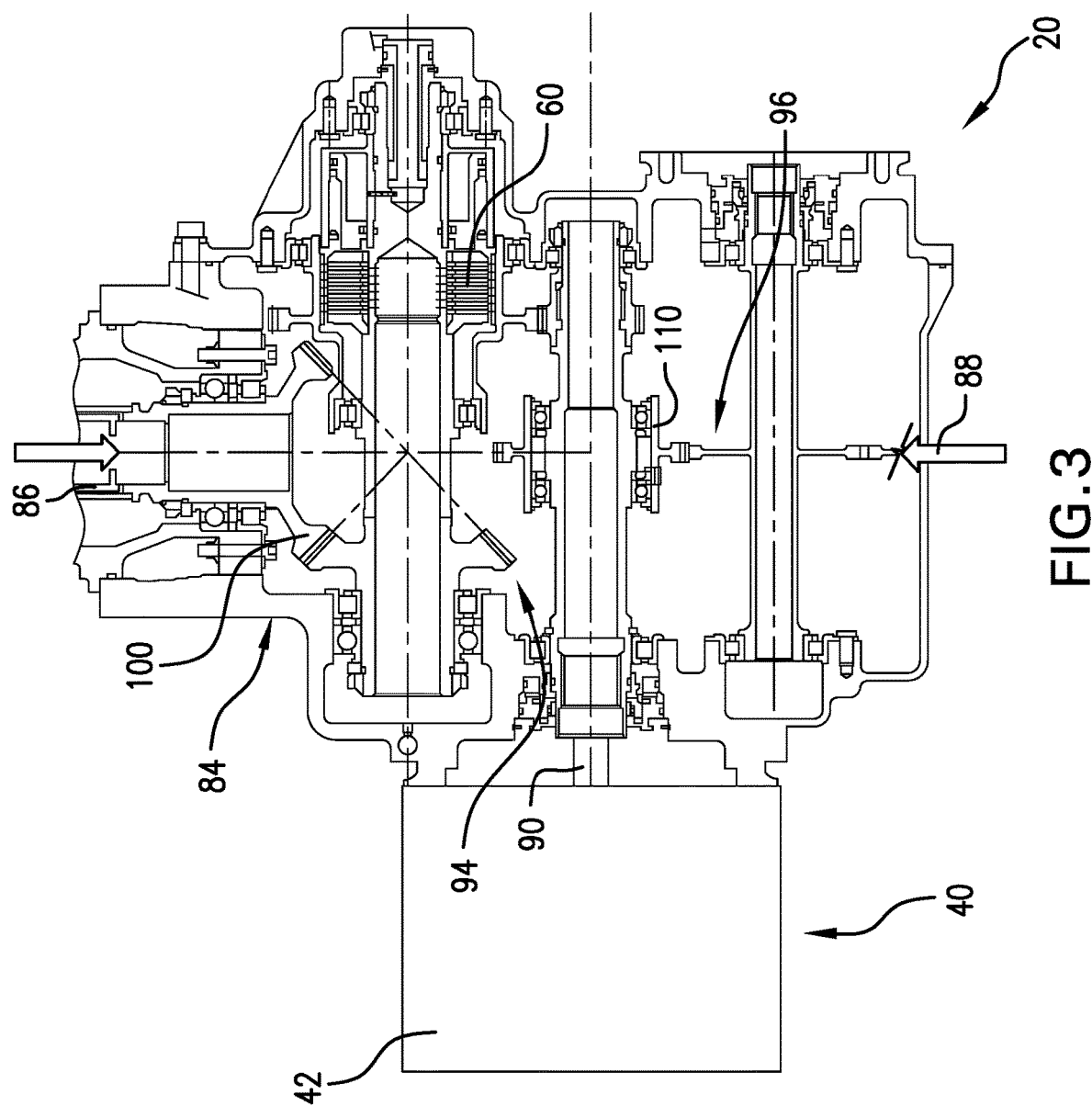
FIG. 3 is a partial cross-sectional view of an accessory gear box of the dual drive, dual clutch accessory drive system, in accordance with a non-limiting example.
Figure 4:
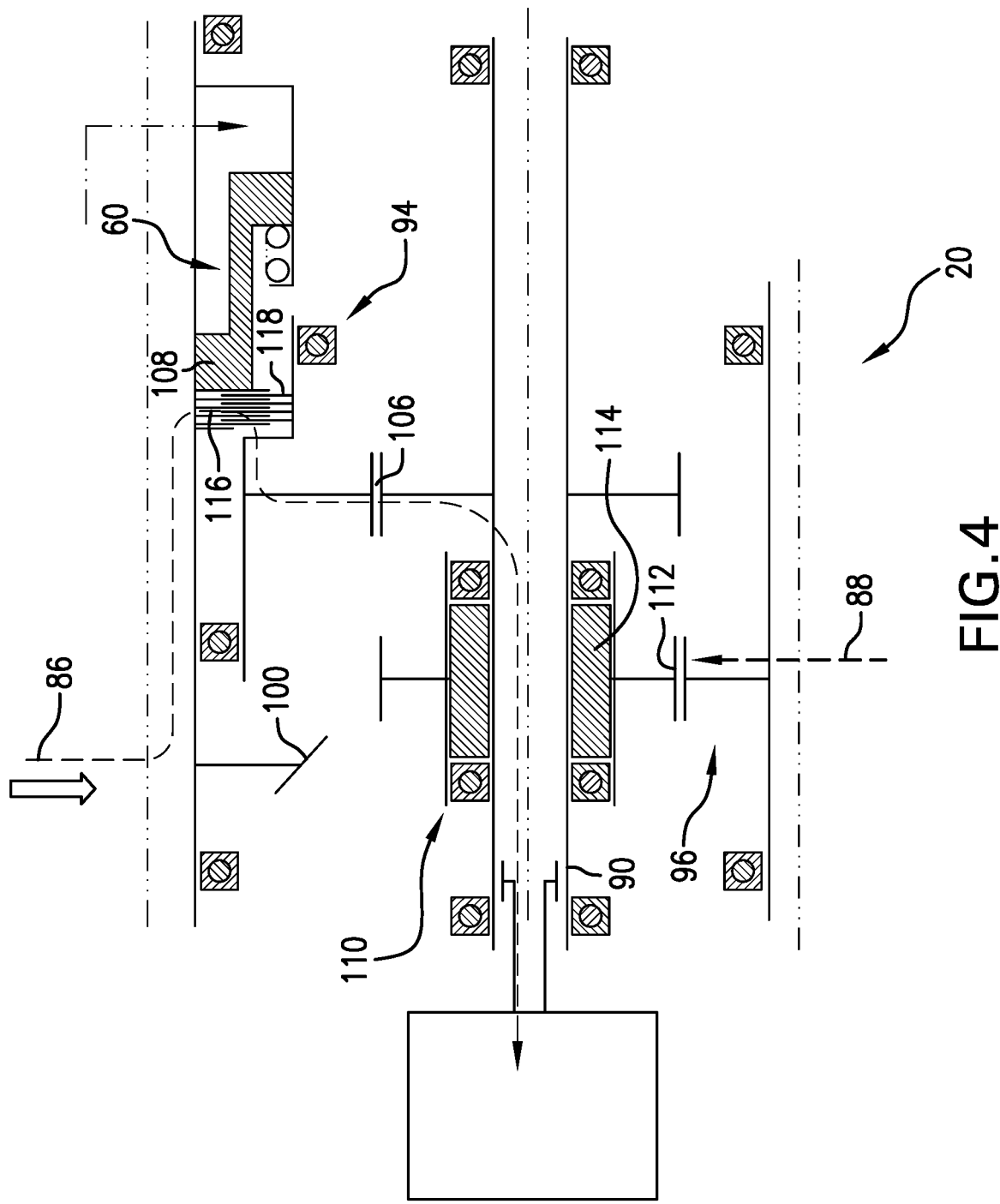
FIG. 4 is a schematic depiction of the dual drive, dual clutch accessory drive system in a first configuration, in accordance with a non-limiting example.

Referring to FIGS. 3 and 4 and with continued reference to FIGS. 1 and 2, dual drive, dual clutch drive system 20 includes a housing 84 that supports a first input shaft 86 coupled to low pressure spool 48, a second input shaft 88 coupled to high pressure spool 50, and an output shaft 90. Dual drive, dual clutch drive system 20 includes a first drive path 94 that selectively connects low pressure spool 48 with output shaft 90 and a second drive path 96 that selectively connects high pressure spool 50 with output shaft 90. In this manner, when low pressure spool 48 is operating within a defined speed zone, accessory 40 may be driven though first drive path 94 and, when low pressure spool 48 is operating outside the defined speed zone, accessory 40 may be driven through second drive path 96 in which high pressure spool 50 is coupled to output shaft 90. At this point, it should be understood, that dual drive, dual clutch drive system 20 maintains a mechanical isolation between low pressure spool 48 and high pressure spool 50.

In a non-limiting example depicted in FIG. 4, first drive path 94 includes an input gear 100 coupled to activatable clutch 60. A transfer gear 106 connects activatable clutch 60 to output shaft 90. In a non-limiting example, activatable clutch 60 defines a wet clutch 108. Second drive path 96 includes a second clutch 110 and a transfer gear 112 that connects second input shaft 88 with output shaft 90. At this point, it should be understood that second clutch 110 may take the form of a passive clutch 114, such as a one-way clutch. However, second clutch 110 may also be an activatable clutch.

Figure 5:
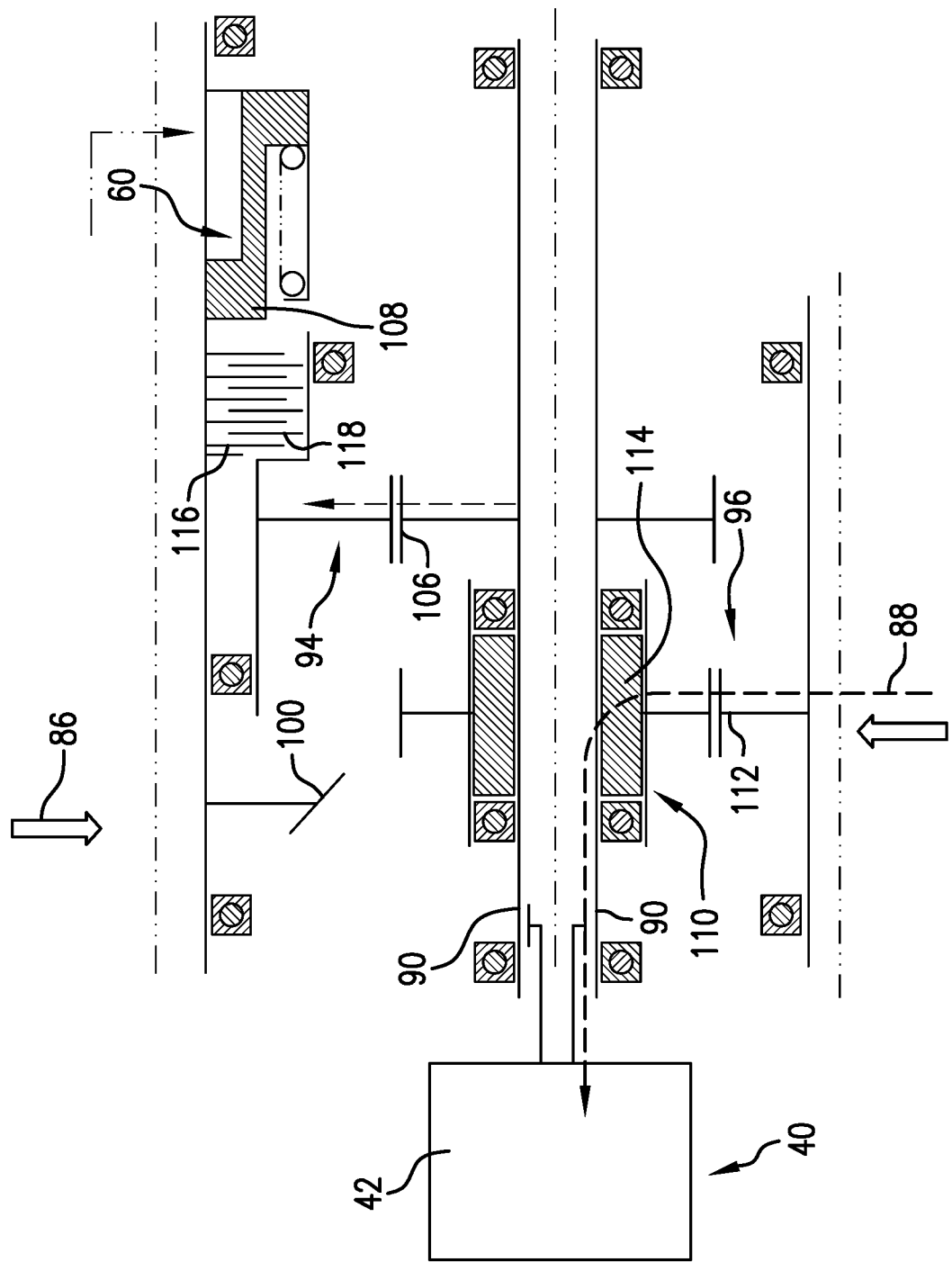
FIG. 5 is a schematic depiction of the dual drive, dual clutch accessory drive system in a second configuration, in accordance with a non-limiting example.

In a non-limiting example, when low pressure spool is operating within a defined speed zone, that is aligned with an operating speed of accessory 40, as sensed by sensor 54, clutch actuator 46 sends a control fluid to activatable clutch 60 bring a first plurality of plates 116 coupled to input gear 100 with a second plurality of plates 118 coupled to transfer gear 106. Once activated, torque from low pressure spool 48 is transferred to output shaft 90 and accessory 40 via first drive path 94. When low pressure spool 48 is operating outside the defined speed zone, clutch actuator 46 relieves the control pressure from activatable clutch 60 thereby disconnecting first drive path 94 from output shaft 90 as shown in FIG. 5. At this point, second input shaft 88 carries torque from high pressure spool 50 through second clutch 110 to output shaft 90. It should be understood that the term "outside the defined speed zone" can define speeds above or below the defined speed zone.

At this point, it should be understood that the non-limiting examples described herein provide a system for running an aircraft accessory from either a low pressure spool or a high pressure spool of a turbine based on an operating speed of the low pressure spool. The accessory may have an operational speed range that is matched with a portion of the low pressure spool speed. When the low pressure spool is operating above or below the operational speed range of the accessory, power may be provided from the high pressure spool. As an example, during normal flight, the accessory may be driven by the high pressure spool. However, when taxiing, power may be provided by the low pressure spool. In this manner, there is no need to run the turbine engine at higher speeds in order to provide a driving power to the accessory via the high pressure spool.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. An aircraft system, including:
a turbine engine having first and second spools;

a dual drive, dual clutch accessory drive system, comprising:
- a first input shaft connected to the first pressure spool of the turbine engine, the first input shaft rotating at a first speed;
- a second input shaft connected to the second spool of the turbine engine that is distinct from the first spool, the second input shaft rotating at a second speed;
- an output shaft operatively connected to an aircraft accessory; and
- a gear box operatively connected to the first input shaft, the second input shaft, and the output shaft, the gear box comprising:
  - a first drive path selectively operatively connecting the first input shaft with the output shaft, the first drive path including a first clutch, which is an activatable clutch, the first drive path being operable to rotate the output shaft when the first input shaft is rotating at the first speed; and
  - a second drive path operatively connecting the second input shaft with the output shaft, the second drive path including a second clutch, which is a passive clutch, the second drive path being operable to rotate the output shaft when the first input shaft is rotating at the second speed;
  - a clutch actuator operable to selectively engage the selectively activatable clutch,
  - wherein the first pressure spool defines a low pressure spool of a turbine engine of the aircraft and the second pressure spool defines a high pressure spool of the turbine engine, and wherein, in operation:
engaging the activatable clutch includes activating the clutch with the clutch actuator; and
disengaging the clutch connects the output shaft to the high pressure spool of the turbine engine.

2. The system according to claim 1, wherein the first drive path includes a gear mechanically connecting the first input shaft with the output shaft.

3. The system according to claim 2, wherein the second drive path includes another gear mechanically connecting the second input shaft to the output shaft.

4. The system according to claim 1, wherein the selectively activatable clutch is a wet clutch.

5. The system according to claim 1, wherein the passive clutch is a one-way clutch.

6. The system according to claim 1, wherein the first drive path is mechanically isolated from the second drive path via the second clutch.

7. A method of driving an accessory for an aircraft through a dual shaft, dual clutch accessory drive system including a gear box having a first input shaft, a second input shaft, and an output shaft, the drive system comprising:
- determining that a first speed of the first input shaft is rotating in a first speed zone;
- engaging an activatable clutch, which is a first clutch of the dual clutch accessory drive system, in a first drive path in the gear box to connect the first input shaft to the output shaft when the first input shaft is rotating at the first speed;
- determining that the first input shaft is rotating at a second speed that is outside the first speed zone; and
- disengaging the activatable clutch to mechanically connect the second input shaft to the output shaft through a second drive path in the gear box when the first input shaft is rotating at the second speed;
- wherein engaging the activatable clutch includes activating the clutch with a clutch actuator; and
- wherein disengaging the clutch connects the output shaft to a high pressure spool of the turbine engine of the aircraft.

8. The method of claim 7, wherein disengaging the activatable clutch mechanically isolates the first input shaft from the output shaft.

9. The method of claim 7, wherein disengaging the activatable clutch includes mechanically connecting the second input shaft to the output shaft through a second clutch.

10. The method of claim 9, wherein mechanically connecting the second input shaft to the output shaft includes passing torque through a passive clutch, which is a second clutch of the dual clutch accessory drive system.

11. The method of claim 10, wherein passing torque through the passive clutch, which is the second clutch of the dual clutch accessory drive system, includes passing torque through a one-way clutch.

12. The method of claim 7, wherein activating the activatable clutch includes passing a control pressure from a clutch controller to the activatable clutch.

13. The method of claim 7, wherein engaging the activatable clutch connects the output shaft to a low pressure spool of a turbine engine of the aircraft.

14. The method of claim 7, wherein engaging the activatable clutch includes activating a wet clutch.

* * * * *